Figure 1:
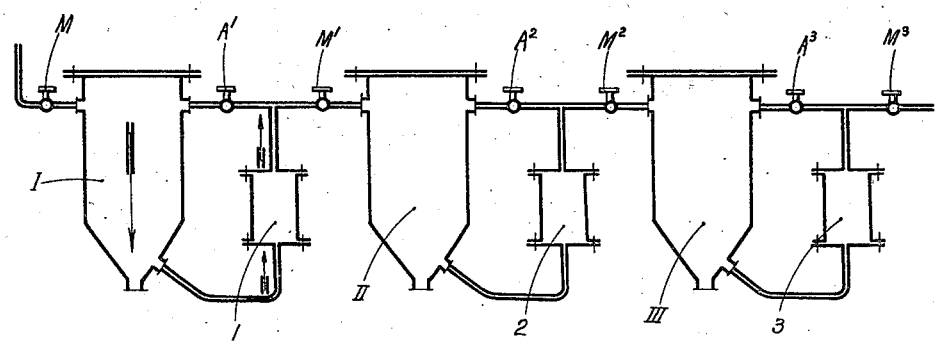

C. COLLARD.
TREATMENT OF OSSEIN FOR THE PRODUCTION OF GELATIN.
APPLICATION FILED AUG. 23, 1921.

1,431,217. Patented Oct. 10, 1922.

INVENTOR
Charles Collard,
by Chas. J. O'Neill.
ATTORNEY.

Patented Oct. 10, 1922.

1,431,217

UNITED STATES PATENT OFFICE.

CHARLES COLLARD, OF ENGHIEN-LES-BAINS, FRANCE.

TREATMENT OF OSSEIN FOR THE PRODUCTION OF GELATIN.

Application filed August 23, 1921. Serial No. 494,556.

*To all whom it may concern:*

Be it known that I, CHARLES COLLARD, citizen of the French Republic, residing at Enghien-les-Bains, department of Seine et Oise, in France, and having P. O. address 1 Rue Félix-Faure, in the said city, have invented certain new and useful Improvements in Treatment of Ossein for the Production of Gelatin, (for which I have filed an application in France, dated July 24th, 1920); and I do hereby declare the following to be a full, clear, and exact description of the invention, such as will enable others skilled in the art to which it appertains to make and use the same.

The invention relates to the treatment of ossein and to its conversion into gelatin.

The extraction of the ossein is generally carried out in the following manner:—

The ossein is charged into large boilers of iron or wood of approximately 500 l capacity and furnished with a double bottom in which is disposed a steam serpentine. The water is supplied to the boiler so as completely to cover the ossein and heat is applied by means of the serpentine until the appropriate temperature is attained. This temperature is maintained until the juice shows 8 to 12 on the gelatinometer and the juice, constituting what is called the first cooking, is drawn off. The boiler is recharged with a suitable quantity of hot water and by proceeding as above, a second boiling is obtained. This process is continued until the extraction of the ossein is completed, this being generally obtained at the end of four operations, occupying approximately ten hours each. Four cookings are thus obtained which are, however, of very different quality. The two first are colourless, limpid and very stringy, whilst the two latter are strongly coloured, cloudy and exhibit a very weak stringiness. This is due to the fact that the extraction of the ossein is not carried out methodically. In effect, for each of the juices it is at the moment when it is richest that it is brought into contact with one very poor and this is of course contrary to the principle of methodical way of enrichment. It follows that to obtain this enrichment it is necessary to operate at higher and higher temperatures. It is the same when passing from one cooking to the next, so that the last ones are obtained at too high temperature which alters the product obtained. Furthermore, during the drawing off, the hot ossein remains in contact with the air and fermentation takes place which strongly alters these products.

To sum up, the defects of the method employed are:—

1st. The non-methodical extraction of the ossein entails a longer treatment and a higher temperature.

2nd. Fermentation is possible because of the contact of the hot ossein with the surrounding air.

The apparatus forming the object of the present invention avoids these two disadvantages, the extraction is made methodical, the juices in proportion to the degree of their enrichment being put into contact with richer and richer materials; finally, there is no fermentation possible as will be seen, for the ossein is constantly immersed in water.

According to the invention the extraction of the ossein is carried out in the following manner:—

The ossein is distributed in a series of boiling apparatuses of special form which are interconnected by means of an appropriate pipe system. Each boiler is provided with an independent heating apparatus (reheater) so disposed that the juices must always pass through a reheater in passing from one boiler into a succeeding one.

The accompanying drawing shows diagrammatically the apparatus employed in carrying out the invention. In Fig. 1 the boilers are indicated by I, II, and III, and the reheaters by 1, 2 and 3. It will be understood that the plant may comprise a larger number of such boilers and reheaters. Considering that there are six of such devices, the six boilers are filled with ossein and water is supplied so as completely to cover it. In order to commence the process, the taps M and M' are closed and the tap A' is opened. The boiler I is isolated from the battery along with its reheater. Steam is supplied to the reheater. By thermo-siphon action, the water of the boiler is raised to the appropriate temperature which is maintained until the juice shows 2% on the gelatinometer. The juice of No. I is then transferred to the No. II boiler the ossein in which has been previously reheated as follows:

The boiler No. II being isolated in the same manner as the boiler No. I, connecting taps M and M' closed, A² is opened and heat is applied until the requisite temperature is obtained, the water being then immediately drawn off. It is so arranged that the temperature can be obtained at the moment when the juice should be passed from the boiler No. I into the boiler No. II. The boiler No. II being empty the taps M and M' are opened and A' and M² are closed. The hot water arriving by M drives the juice from the boiler and causes it to pass into the boiler No. II. The operation being finished, each boiler is isolated and the temperature is maintained until the juice reaches 2% and 4%. At this moment the juice of No. II is sent into No. III whilst the juice of No. I comes into No. II and so on for the six sets.

Figure 2:
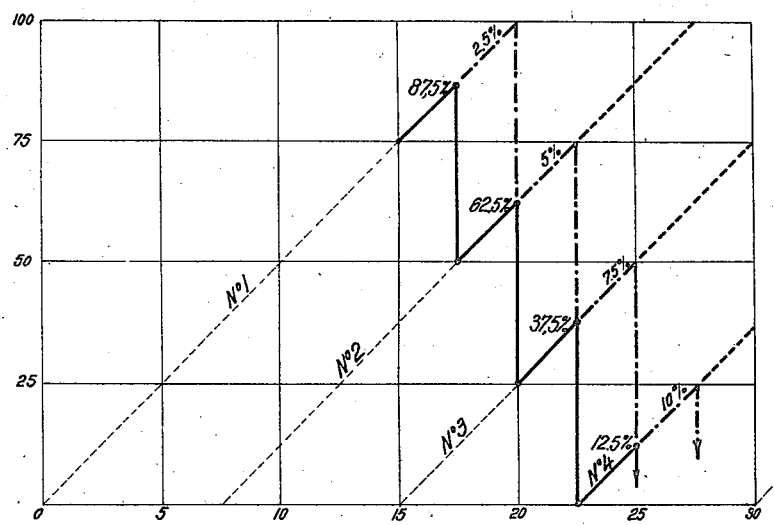

The process is clearly shown in the diagram illustrated in Fig. 2, using four boilers, the abscissa being proportional to the time (hours) and the ordinates the values of the degree of exhaustion. The figure 0 relating to fresh stuff and 100 to the exhausted one, concentrations are indicated by figures, 2, 5% and so on.

From this moment the apparatus is in normal operation and it suffices to regulate the supply of hot water to the tap M so as to maintain the concentration indicated by each of the boilers. This process will be continued until the juice in No. I is concentrated. This apparatus will then be isolated, emptied, washed and recharged with fresh ossein after which it can be replaced in the system.

To avoid stops and in order that the operation shall be regular, it is necessary to have an apparatus of more than the number indicated.

It will be observed that the extraction is carried out methodically since when the juice arrives in No. VI, where it meets fresh ossein, it has already traversed five sets of apparatus containing progressively newer ossein so that on its exit from No. VI, the juices have received six washings with pure water. As hereinbefore stated, the ossein is always immersed in water so that contact with the surrounding air is impossible.

Claims—

1. An apparatus for the extraction of ossein comprising a plurality of boilers, a plurality of reheaters, a pipe system and associated valves interconnecting said boilers and reheaters and means for causing an automatic circulation of the juices successively through said boilers.

2. An apparatus for the extraction of ossein comprising a plurality of boilers, a plurality of associated reheaters and a pipe system and associated valves interconnecting said boilers and reheaters, said boilers and reheaters and the interconnecting pipe system being so arranged that the reheating is obtained by thermo-siphon action and the circulation of the juice is obtained by dis-displacement.

In testimony whereof I affix my signature.

CHARLES COLLARD.